(12) United States Patent
Hitchcock et al.

(10) Patent No.: US 11,433,353 B2
(45) Date of Patent: Sep. 6, 2022

(54) HYDROGEN ISOTOPE SEPARATION METHODS AND SYSTEMS

(71) Applicants: SAVANNAH RIVER NUCLEAR SOLUTIONS, LLC, Aiken, SC (US); CLEMSON UNIVERSITY, Clemson, SC (US); GEORGIA TECH RESEARCH CORPORATION, Atlanta, GA (US)

(72) Inventors: Dale A. Hitchcock, Aiken, SC (US); Steven M. Serkiz, Aiken, SC (US); Timothy M. Krentz, Aiken, SC (US); Josef A. Velten, Dallas, TX (US); Kyle S. Brinkman, Clemson, SC (US); Eric M. Vogel, Marietta, GA (US); Katherine T. Young, Atlanta, GA (US)

(73) Assignees: Savannah River Nuclear Solutions, LLC, Aiken, SC (US); Clemson University Research Foundation, Clemson, SC (US); Georgia Tech Research Corporation, Atlanta, GA (US)

( * ) Notice: Subject to any disclaimer, the term of this patent is extended or adjusted under 35 U.S.C. 154(b) by 378 days.

(21) Appl. No.: 16/433,500

(22) Filed: Jun. 6, 2019

(65) Prior Publication Data

US 2020/0384411 A1    Dec. 10, 2020

(51) Int. Cl.
*B01D 59/42* (2006.01)
*B01D 59/14* (2006.01)
(Continued)

(52) U.S. Cl.
CPC ............. *B01D 59/42* (2013.01); *B01D 59/14* (2013.01); *B01D 71/02* (2013.01); *B01D 71/021* (2013.01);
(Continued)

(58) Field of Classification Search
CPC ................................ B01D 59/38; B01D 59/42
See application file for complete search history.

(56) References Cited

U.S. PATENT DOCUMENTS 6,667,100 B2   12/2003   Rutherford et al.
7,071,258 B1   7/2006    Jang et al.
(Continued)

FOREIGN PATENT DOCUMENTS

DE    2950911    9/1980
EP    1435630    4/2006
(Continued)

OTHER PUBLICATIONS

Hidalgo et al, "Scalable and efficient separation of hydrogen isotopes using graphene-based electrochemical pumping," Nature Communications, May 2017 (Year: 2017).*

(Continued)

*Primary Examiner* — Salil Jain
(74) *Attorney, Agent, or Firm* — Dority & Manning, P.A.

(57) ABSTRACT

Methods and systems for the separation of hydrogen isotopes from one another are described. Methods include utilization of a hydrogen isotope selective separation membrane that includes a hydrogen isotope selective layer (e.g., graphene) and a hydrogen ion conductive supporting layer. An electronic driving force encourages passage of isotopes selectively across the membrane at an elevated separation temperature to enrich the product in a selected hydrogen isotope.

18 Claims, 3 Drawing Sheets

(51) Int. Cl.
  B01D 71/02 (2006.01)
  C01B 4/00 (2006.01)
(52) U.S. Cl.
  CPC ......... B01D 71/022 (2013.01); B01D 71/024 (2013.01); B01D 71/025 (2013.01); B01D 71/027 (2013.01); C01B 4/00 (2013.01)

(56) References Cited

U.S. PATENT DOCUMENTS

| | | | |
|---|---|---|---|
| 7,988,941 B2 | 8/2011 | Choi et al. | |
| 8,632,855 B2 | 1/2014 | Wenxu et al. | |
| 8,734,683 B2 | 5/2014 | Yu et al. | |
| 9,005,486 B2 | 4/2015 | Brinkman | |
| 9,023,550 B2 | 5/2015 | Brinkman | |
| 9,475,007 B2 | 10/2016 | Wilson | |
| 9,527,044 B2 | 12/2016 | Wachsman et al. | |
| 9,534,296 B2 | 1/2017 | McAlister | |
| 9,687,775 B2 | 6/2017 | Chen et al. | |
| 10,926,228 B2* | 2/2021 | Lozada | B01D 67/0069 |
| 2006/0065520 A1 | 3/2006 | Ballantine et al. | |
| 2011/0084237 A1* | 4/2011 | Wachsman | B01J 19/2485 |
| | | | 252/373 |
| 2011/0297894 A1 | 12/2011 | Brinkman | |
| 2012/0122014 A1 | 5/2012 | Brinkman | |
| 2014/0260195 A1 | 9/2014 | McAlister | |
| 2015/0314232 A1 | 11/2015 | Chen et al. | |
| 2016/0053387 A1* | 2/2016 | Kutchcoskie | C25B 1/02 |
| | | | 205/637 |
| 2017/0263966 A1 | 9/2017 | Lozada et al. | |
| 2018/0056240 A1* | 3/2018 | Xiao | B01D 61/007 |
| 2020/0123668 A1* | 4/2020 | He | C25B 1/042 |

FOREIGN PATENT DOCUMENTS

| | | |
|---|---|---|
| WO | WO 2015/048666 | 4/2015 |
| WO | WO 2015/091781 | 6/2015 |
| WO | WO 2017/017433 | 2/2017 |

OTHER PUBLICATIONS

Bayer, et al. "Tunable Mixed Ionic/Electronic Conductivity and Permittivity of Graphene Oxide Paper for Electrochemical Energy Conversion" *Appl Mater Interfaces* 8(18) (2016) pp. 11466-11475. (Abstract only).
Bukola, et al. "Selective proton/deuteron transport through Nafion |graphene| Nafion sandwich structures at very high current density" *J Am Chem Soc* 140(5) (2018) pp. 1743-1752. (Abstract only).
Chen, et al. "Progress and Challenges in Transfer of Large-Area Graphene Films" *Advanced Science* 3(8):1500343 (2016) pp. 1-15.
Drahushuk, L.W. "Transport of Molecules through and on Carbon Nanostructures" *Mass Inst Tech* (2017) pp. 1-116.
Enotiadis, et al. "Graphene-Based Nafion Nanocomposite Membranes: Enhanced Proton Transport and Water Retention by Novel Organo-functionalized Graphene Oxide Nanosheets" *Small* 8(21) (2012) pp. 3338-3349.
Hu, et al. "Proton transport through one-atom-thick crystals" *Nature* 516 (2014) pp. 227-230.
Li, et al. "Engineered Transport in Microporous Materials and Membranes for Clean Energy Technologies" *Adv Mater* 30(8):1704953 (2018) pp. 1-33.
Lozada-Hidalgo, et al. "Scalable and efficient separation of hydrogen isotopes using graphene-based electrochemical pumping" *Nature Communications* 6:15215 (2017) pp. 1-5.
Lozada-Hidalgo, et al. "Sieving hydrogen isotopes through two dimensional crystals" *Science* 351(6268) (2016) pp. 68-70, S2-S20.
Meng, et al. "Review: recent progress in low-temperature proton-conducting ceramics" *J Mater Sci* (2019) pp. 1-22.
Sevigny, et al. "Separation of Tritiated Water Using Graphene Oxide Membrane" *Pacific Northwest National Laboratory* PNNL-24411 (2015) pp. 1-39.
Yan, et al. "A monolayer graphene—Nafion sandwich membrane for direct methanol fuel cells" *J Power Sources* 311 (2016) pp. 188-194.

* cited by examiner (a) (b) (c)

$BaCe_{0.7}Zr_{0.1}Y_{0.1}Yb_{0.1}O_{3-\delta}$

US 11,433,353 B2

HYDROGEN ISOTOPE SEPARATION METHODS AND SYSTEMS

STATEMENT AS TO RIGHTS TO INVENTIONS MADE UNDER FEDERALLY SPONSORED RESEARCH

This invention was made with Government support under Contract No. DE-AC09-08SR22470 awarded by the United States Department of Energy. The Government has certain rights in the invention.

This application and technology are controlled pursuant to ECCN 1E001 and 1B231.

BACKGROUND

The separation of hydrogen isotopes from one another is desirable for multiple purposes. The stable deuterium isotope, which accounts for less than about 0.02 wt. % of naturally occurring hydrogen, is used in production of heavy water as well as in research and medical applications. Tritium is a low energy beta emitter produced in nuclear power generation as a by-product of the fission of uranium-235, plutonium-239, and uranium-233 as well as by neutron activation of lithium-6. While tritium is not dangerous externally, it is a radiation hazard upon inhalation, ingestion or absorption and separation is necessary not only for personal safety reasons but to maintain performance standards of nuclear systems. Tritium also finds use in experimental fusion reactors and as a detectable label in analytical chemistry, as well as in self-powered lighting devices.

Standard hydrogen isotope separation technologies are aqueous-based systems utilizing chemical isotope exchange. The primary industrial approach is the Gridler sulfide process, which utilizes an isotopic exchange between $H_2S$ and $H_2O$ to produce $D_2O$ over many (e.g., hundreds) of stages. Other approaches utilize distillation systems. Unfortunately, isotope separation methods are extremely expensive with large energy consumption.

Monolayers of two-dimensional crystals (graphene and hexagonal boron-nitride) have been found to be selectively permeable to hydrogen isotopes. These materials have been adhered to ion-conducting polymer films (Nafion®) to form electrochemical pumps capable of transporting aqueous phase hydrogen isotopes across the membranes for various purposes. These materials require isotope presence in the aqueous phase in order to obtain membrane permeation as the membrane conduction mechanism involves solvation of an ion by anywhere from three to six water molecules. As such, the ion conductivity of the membrane is highly dependent on the degree of solvation and the water flux will be proportional to the ion flux. Unfortunately, the polymer membranes utilized in these hydrogen pumps can exhibit mechanical issues (shrinking, swelling, cracking, delamination, etc.), which can lead to damage to the two-dimensional crystal layers and performance degradation.

What are needed in the art are methods and systems that can be used to separate hydrogen isotopes from one another without the necessity of an aqueous-based system. Stable and durable systems that can achieve high isotope selectivity would be of great benefit in the art.

SUMMARY

Aspects and advantages of the invention will be set forth in part in the following description, or may be obvious from the description, or may be learned through practice of the invention.

According to one embodiment, disclosed are methods for separating hydrogen isotopes from one another. A process can be utilized to separate protium from deuterium, protium from tritium, deuterium from tritium, or a combination thereof (e.g., protium from deuterium and tritium, etc.). The process includes contacting the first side of a separation membrane with sample including at least two hydrogen isotopes. The separation membrane includes a hydrogen isotope selective layer and a hydrogen ion conductive layer adjacent to one another. The hydrogen isotope selective layer includes an essentially two-dimensional crystalline material, e.g., graphene or hexagonal boron nitride. The hydrogen ion conductive layer includes a ceramic, e.g., a perovskite type ceramic, that conducts hydrogen ions at the atomic level, i.e., without the necessity of forming a complex with a transporting molecule such as water.

The method also includes applying a voltage across the separation membrane at an elevated separation temperature. Under the driving force of the applied voltage the separation membrane can form and conduct hydrogen ions with isotope selectivity to produce a product at the second side of the separation membrane that is enriched in the lighter hydrogen isotope(s) (e.g., protium) and leaving a product at the first side of the separation membrane that is enriched in the heavier hydrogen isotope(s) (e.g., deuterium).

Systems for carrying out an isotope separation process are also disclosed. For instance, a system can include a separation module that in turn includes a first chamber and a second chamber with a separation membrane forming a gas-tight seal there between. The separation membrane is located so as to separate and isolate the two chambers from one another. The separation membrane includes a hydrogen isotope selective layer and a hydrogen ion conductive layer as described. In addition, a system can include an electric circuit that is configured to apply a voltage between the first side of the separation membrane and the second side of the separation membrane and a heating device to heat the chambers and/or the separation membrane such that the separation membrane is heated to a separation temperature. A system can also include transport mechanisms, e.g., lines, pumps, control systems, etc., that can convey a sample, e.g., a non-aqueous gas sample, to and from the chambers.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

Figure 1:
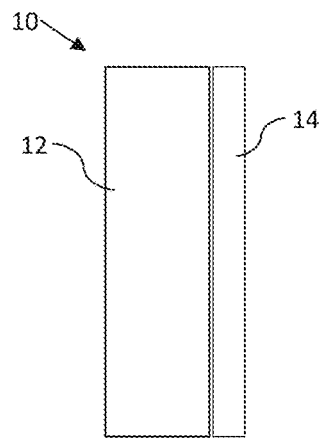
FIG. 1 illustrates one embodiment of a separation membrane as described herein.

Repeat use of reference characters in the present specification and drawings is intended to represent the same or analogous features or elements of the subject matter.

DETAILED DESCRIPTION

It is to be understood by one of ordinary skill in the art that the present discussion is a description of exemplary embodiments only and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, disclosed herein are methods and systems directed to the separation of hydrogen isotopes from one another. In one embodiment disclosed are methods and systems that can be utilized to concentrate deuterium from a hydrogen source, for instance in formation of heavy water. The methods are not limited to concentration of deuterium, however, and can be used to separate hydrogen isotopes for any purpose. For instance, methods can be utilized to separate tritium from protium or a protium/deuterium mixture for decontamination and clean-up purposes. A method can optionally include multiple steps to separate all three isotopes of a feed stream from one another. For instance, beginning with a feed stream that includes protium, deuterium, and tritium, a method can provide in a first step a first product stream enriched in protium and a second product stream enriched in deuterium and tritium. Additional processing through a second separation protocol can further separate the isotopes of the second product stream to provide a third product stream enriched in deuterium and a fourth product stream enriched in tritium. Multiple steps can be carried out to further enrich each stream and provide products containing a single hydrogen isotope and essentially free of any other hydrogen isotopes.

Disclosed methods can separate hydrogen isotopes with a high separation factor in a single separation step. In certain embodiments, disclosed methods can exhibit a single step separation factor for gaseous protium to deuterium concentration of about 8 or greater, or about 3.3 or greater in some embodiments. When considering separation of tritium from other hydrogen isotopes, disclosed methods can exhibit a single step separation factor for gaseous protium to tritium concentration of up to about 30, e.g., from about 10 to about 30, in some embodiments.

Beneficially, the separation methods do not depend upon the solvation of hydrogen ions for transport across the isotope selective separation membrane and as such, can provide excellent ion conductivity and separation rates independent of the degree of hydration of the samples. For instance, in one embodiment, disclosed methods can be utilized to separate hydrogen isotopes in a non-aqueous phase, e.g., $H_2O$ content of ambient air or less, such as about 0.03 $kg/m^3$ or less, 0.02 $kg/m^3$ or less, or 0.01 $kg/m^3$ or less, for instance in a dry gas phase feed. However, it should be understood that the presence of water in a sample to be treated is not prohibited in disclosed methods. A sample to be treated can include water, but the presence of water in a sample is not required as was the case for previous hydrogen isotope separation technologies. Because the isotope selective membrane transport mechanism does not rely on solvation or chemical bonding of the transported ion with water molecules, a product can in some embodiments be dry, even if the sample to be treated contains a significant amount of water. In other embodiments, both the feed and product can include a significant of water and can thus be considered to include an aqueous phase (e.g., a vapor), but the product can have a different (e.g., lower) water content than the feed. This can be attained due to the fact that the ion flux across the separation membrane is not proportional to water flux across the separation membrane, as was the case for previous water-based technologies.

The separation method is carried out by use of a separation membrane that exhibits hydrogen ion conductivity as well as hydrogen isotope selectivity. As illustrated in FIG. 1, a separation membrane 10 can include at least one layer 14 that exhibits hydrogen isotope selectivity and this layer 14 can be adjacent to at least one layer 12 that exhibits hydrogen ion conductivity.

The hydrogen isotope selective layer 14 can include an essentially two-dimensional crystalline material. As utilized herein, the term "essentially two-dimensional" generally refers to a material that includes from 1 to about 5 (e.g., 1 to 3) atomic or molecular layers. The atoms of a single layer are generally covalently bonded to one another, with adjacent layers (if present) being more weakly bonded or adhered to one another. In addition, the individual layers of a hydrogen isotope selective layer can be identical to one another or can differ from one another.

As utilized herein, the term "crystalline" generally refers to a material in which the atoms or molecules are arranged in a regular, periodic manner. In one embodiment, individual layers of a hydrogen isotope selective layer can include atoms in a hexagonal pattern, which can provide quantum confinement on the electronic structure of the materials, thereby allowing selective quantum tunneling of hydrogen isotopes across the material.

In one embodiment, the hydrogen isotope selective layer 14 can include from 1 to about 5 layers of graphene, hexagonal boron nitride, or a transition metal dichalcogenide. Dichalcogenides can generally include those of the type $MX_2$ in which M may be Mo, W, Nb, V, Ta, Ti, Zr, Hf, Tc, or Re, and X may be S, Se, or Te. A dichalcogenide may be, for example, $MoS_2$, $MoSe_2$, $MoTe_2$, $WS_2$, $WSe_2$, $WTe_2$, $ZrS_2$, $ZrSe_2$, $HfS_2$, $HfSe_2$, $NbSe_2$, or $ReSe_2$.

In some embodiments, the hydrogen ion selective layer 14 can include a catalytic metal selected from Groups 8 to 10 of the periodic table, which can reduce the thermal conduction barrier of the material. When present, a catalytic metal can generally be located in a discontinuous fashion, e.g., in the form of nano-sized dots, on a surface of the hydrogen isotope selective layer.

The hydrogen isotope selective layer 14 can be monolithic across a separation membrane 10. In general, it can be continuous and essentially free of large defective sites that could interfere with the selectivity of the layer for the hydrogen isotopes. As such, hydrogen isotopes can pass through the body of the layer and materials that are not favorably passed through the material (i.e., other components carried in a feed stream) can be prevented from passage across the hydrogen isotope selective layer.

The hydrogen isotope selective layer 14 may be formed according to standard methodology as is known in the art for preparing such materials. By way of example, an isotope selective layer may be formed according to a chemical vapor deposition (CVD) method or an atomic layer deposition (ALD) method. Certain isotope selective layers, and in particular graphene, may be formed according to a pyrolysis methodology. Various methods for forming graphene sheets have been described, for instance in U.S. Pat. Nos. 6,667,100; 7,071,258; 8,734,683; 7,988,941; and 8,632,855, all of which are incorporated herein by reference. Dichalcogenide layers can be formed in one embodiment according to an ALD method, for instance as described in International Patent Application Publication No. WO2015/091781, which is incorporated herein by reference.

As stated, the hydrogen isotope selective layer can be about 5 atomic or molecular layers or less in thickness. As such, in order to provide suitable structural integrity to the separation membrane 10 and allow for scale-up of a system, the separation membrane 10 can also include a hydrogen ion conductive layer 12. In addition to providing structural integrity not available to previously known polymer support layers, the hydrogen ion conductive layer 12 can conduct ionic hydrogen isotopes in the gas phase, without requirement of hydration of the ions for passage across the layer.

The hydrogen ion conductive layer 12 can include a hydrogen ion conductive ceramic. By way of example, hydrogen ion conductive layer 12 can include a doped perovskite type ceramic of the general composition $$A_{1-x-\alpha}P_xB_{1-y}Q_yO_{3-\delta}$$

in which A is a bivalent cation such as Ba, Sr, Ca or Mg and combinations thereof, P is an A-site dopant, which may be a cation such as Pr, Sm, Er or other cations belonging to the lanthanide series. B is a tetravalent cation which may be either an element in Group IV of the period table (e.g., Ti, Zr) or an element in the lanthanide series of the periodic table (e.g., Ce, La) or a combination thereof. Q is a B-site dopant which may be either an element in Group III of the period table (e.g., Sc, Y) or another element (other than B) in the lanthanide series of the periodic table (e.g., Eu, Nd, Gd, Yb) or a combination thereof. $\alpha$ represents the A-site non-stoichiometry (deficiency), and $\delta$ is an oxygen deficiency. In one embodiment, $\alpha$ can be from about 0 to about 0.1 and $\delta$ can be from about 0 to about 0.3. Some embodiments can include compounds with specific combination of elements on the A and B sites represented by the chemical formulas $Ba_{1-x-\epsilon}P_xCe_{1-y}Q_yO_{3-\delta}$, $Sr_{1-x-\epsilon}P_xCe_{1-y}Q_yO_{3-\delta}$, and $Ca_{1-x-\epsilon}P_xTi_{1-y}Q_yO_{3-\delta}$. Other embodiments can include an A-site deficiency $\epsilon$, where $0 \le \alpha \le 0.1$ and where $0 \le \epsilon \le 0.3$. It should be understood that P and Q may represent more than one element of the type specified above, and addition of more than one dopant at the A and B site fall within the scope of this disclosure.

In one embodiment, a hydrogen ion conductive layer 12 can include a complex perovskite. For example, a complex perovskite can be of the types $A_2(B'_{1+\beta}B''_{1-\beta})O_{6-\lambda}$ or $A_3(B'_{1+\phi}B''_{2-\phi})O_{9-\lambda}$, in which A ions are always bivalent as described above; B' ions are trivalent (e.g., Y, Ga, Sc, In; Yb, Nd) or tetravalent (e.g., Zr, Ti, Ce), and B" ions are pentavalent (e.g., Bi, Nb). Generally, $0 \le \beta \le 0.2$ and $0 \le \phi \le 0.2 \cdot \lambda$ may range from about 0 to about 0.2.

In one embodiment, a hydrogen ion conductive layer 12 can include a pyrochlore structure $(A_{2-\gamma}A''_\gamma)_2(B_{2-\eta}R_\eta)O_{7-\lambda}$ where A is a bivalent cation; A" is another bivalent cation, B is a tetravalent cation as described above, and R is a bivalent cation (e.g., Ca). In one embodiment, A" and R can be the same cation. Generally, $0 \le \gamma \le 0.3$ and $0 \le \eta \le 0.3$.

Examples of perovskite-type ceramics as may be utilized in hydrogen ion conductive layer can include, without limitation, $BaZrO_3$, $BaZr_{0.25}In_{0.75}O_{3-\delta}$, $BaZr_{0.9}Y_{0.1}O_3$, $BaZr_{0.85}Y_{0.15}O_3$, $Ba_{0.97}Zr_{0.77}Y_{0.19}Zn_{0.04}O_3$, $BaZr_{0.8}Y_{0.2}O_3$, $BaZr_{0.5}In_{0.5}O_{3-\delta}$, $BaCeO_3$, $BaZr_{0.1}Ce_{0.7}Y_{0.2}O_{3-d}$, $BaCe_{0.9}Gd_{0.1}O_3$, $BaCe_{0.8}Zr_{0.1}Gd_{0.1}O_3$, $BaCe_{0.45}Zr_{0.45}Sc_{0.1}O_3$, $BaCe_{0.7}Zr_{0.1}Y_{0.1}Yb_{0.1}O_{3-\delta}$, $BaCe_{0.65}Zr_{0.20}Y_{0.15}O_{3-\delta}$, $BaCe_{0.9}Y_{0.1}O_{2.95}$, $BaCe_{0.8}Y_{0.2-x}Nd_xO_{3-\delta}$ (x=0-0.15), $Ba_{0.5}Sr_{0.5}Ce_{0.6}Zr_{0.2}Gd_{0.1}Y_{0.1}O_{3-\delta}$, $BaSn_{0.5}In_{0.5}O_{2.75}$, $Ba_{0.9}La_{0.1}Sn_{0.5}In_{0.5}O_{2.8}$, $Ba_{0.9}Gd_{0.1}Sn_{0.5}In_{0.5}O_{2.8}$, $SrCeO_3$, $SrCe_{0.95}Yb_{0.05}O_3$, $Sr_3CaZr_{0.5}Ta_{1.5}O_{8.75}$, $CaZrO_3$, $SrZrO_3$, $BaTiO_3$ $Ce_{0.9}Gd_{0.1}O_{2-\delta}$, etc.

Other examples of proton conducting ceramics as may be incorporated in a hydrogen ion conductive layer can include, without limitation, fluorite-type materials such as yttria stabilized zirconia (YSZ); metal oxide hydrates like $ZrO_2 \cdot nH_2O$, $Sb_2O_5 \cdot nH_2O$ and $WO_3 \cdot 2H_2O$; simple oxides such as $TiO_2$, $ZrO_2$, $CeO_2$, and phosphate type materials such as $Sn_{0.9}In_{0.1}P_2O_7$, $CsH_2PO_4/SiP_2O_7$ composites, $SnP_2O_7$—$SnO_2$ composites.

In general, a hydrogen ion conductive layer 12 can be relatively thin, so as to not impede transport of the selected isotope ions across the separation membrane 10. For instance, and depending upon the particular materials of the layer, in one embodiment, a hydrogen ion conductive layer 12 can be about 500 micrometers (µm) or less in thickness, e.g., about 200 µm or less, about 100 µm or less, or about 50 µm or less in some embodiments.

Figure 2:
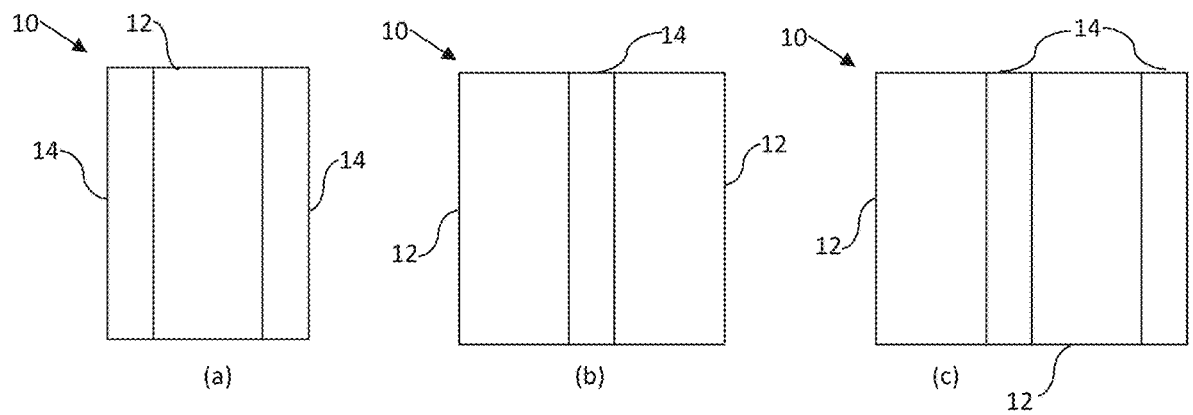
FIG. 2 illustrates three different configurations for a separation membrane as described herein.

The separation membrane can include one or more individual layers of the various materials. By way of example, FIG. 2 illustrates three representative examples for different configurations of a separation membrane 10. As illustrated in FIG. 2, a separation membrane 10 can include one or more hydrogen isotope selective layers 14 and one or more hydrogen ion conductive layers 12. For instance, the embodiment illustrated at (a) of FIG. 2 includes two hydrogen isotope selective layers 14, which can be the same or different from one another, located on either side of a hydrogen ion conductive layer 12.

In another configuration, illustrated at (b) in FIG. 2, a separation membrane 10 can include a single hydrogen isotope selective layer 14 sandwiched between two hydrogen ion conductive layers 12, which can be the same or different from one another. It should be understood however that the separation membrane is not limited to a combination of two layers as in FIG. 1 or a combination of three layers. For instance, and as illustrated at (c) of FIG. 2, a separation membrane 10 can be formed of multiple hydrogen isotope selective layers 14 and multiple hydrogen ion conductive layers 12. Additional layers are also encompassed in a separation membrane. However, in order to maintain desired ionic flow across the separation membrane, a separation membrane will generally include no more than about 5 layers.

The individual layers of a separation membrane can be held adjacent to one another according to any methodology. For instance, in one embodiment, a hydrogen isotope selective layer can be formed on a surface of a previously formed hydrogen ion conductive layer. Similarly, a hydrogen ion conductive layer can be formed, e.g., extruded, on a surface of a previously formed hydrogen isotope selective layer. Alternatively, the previously formed individual layers can be simply located adjacent to one another prior to assembly in formation of a separation device. In another embodiment, individual layers of a separation membrane can be adhered to one another by use of an adhesive or the like in such a fashion that ionic flow across the membrane is not impeded. For instance, the layers can be adhered to one another at edges or at periodic locations across the membrane surface.

Figure 3:
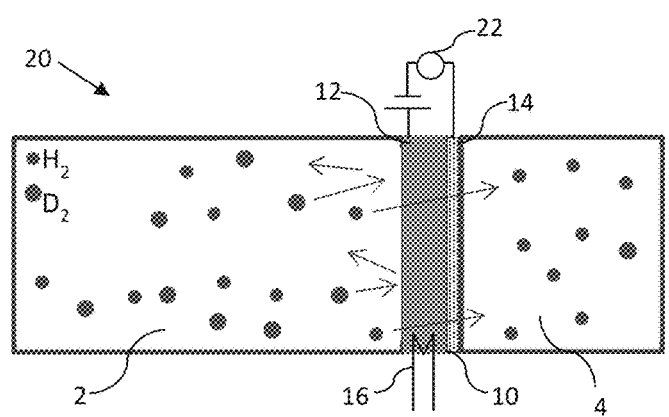
FIG. 3 illustrates a separation system as described herein.

FIG. 3 illustrates one embodiment of a separation device 20 that can be utilized to carry out a separation protocol. As illustrated, a separation device 20 can include a power source 22 in electronic communication with both sides of the separation membrane 10. During use, an electronic potential can be established across the separation membrane 10, which can form hydrogen ions at the separation membrane 10 and drive isotope ions across the separation membrane from a feed chamber 2 to a product chamber 4. The feed chamber 2 and the product chamber 4 can generally be isolated from one another but for the separation membrane 10 between the two. The separation membrane can form a gas-tight seal between the feed chamber 2 and the product chamber 4 in those embodiments in which a separation protocol includes a gas-phase feed gas.

The separation membrane 10 illustrated in FIG. 3 includes the hydrogen ion conductive layer 12 on the feed side of the system 20 and the hydrogen isotope selective layer 14 on the product side of the system 20, but this is not a requirement of disclosed systems. Alternatively, a system 20 can be designed such that a sample in the feed chamber 2 contacts the hydrogen isotope selective layer 14 and the hydrogen ion conductive layer is downstream, nearer the product chamber 4.

In order to establish a voltage across the separation membrane 10, electrodes can be located on either side of the separation membrane 10. The electrodes can generally include a current collector capable of establishing the drive voltage and injection of the isotope ions through the separation membrane 10. In general, the lighter isotopes will be injected across the separation membrane first and as such the product chamber 4 can be enriched in the lighter of the isotopes, e.g., protium.

A suitable drive voltage can be about 20 Volts or less, for instance about 5V or less in some embodiments. In some embodiments a suitable drive voltage can be less, for instance about 1.5V or less, about 1.25V or less, about 1V or less, about 500 mV or less, or about 200 mV or less in some embodiments.

A system 20 can also include a heat source 16 that can heat one or more of a separation membrane 10, a feed chamber 2, or a sample fed to the feed chamber 2 such that the separation membrane 10 is heated to a separation temperature that can drive the transport of the hydrogen ions across the separation membrane 10. In general, a separation temperature can be about 200° C. or greater, for instance from about 200° C. to about 800° C., from about 300° C. to about 700° C., or from about 400° C. to about 600° C. in some embodiments.

As discussed previously, a system can be designed to separate any hydrogen isotope(s) from any other. For instance, when considering a feed that includes all three of protium, deuterium, and tritium, following formation of a protium-enriched product, further treatment of the sample in the feed chamber 2 can lead to passage of deuterium across the separation membrane 10, thereby leaving a tritium-enriched product in the feed chamber 2. The product chamber 4 can thus include a mixture of protium and deuterium.

Further processing of a product can be carried out, if desired. For instance, a mixture of protium and deuterium in a first product chamber can be further processed to provide a protium-enriched product and a deuterium-enriched product.

In one embodiment, a system can include multiple separation membranes in series with one another, with the product chamber of one membrane system functioning as the feed chamber for the next membrane system. Such a multi-membrane system can be utilized to achieve greater separation between individual isotopes of the original feed mixture. Any number of separation membranes can be placed in series with one another. For instance, a system can include from 2 to hundreds of separation membranes in series with one another. Moreover, a system can include parallel processing, each line of which can include a plurality of separation membranes in series with one another, which can further increase separation capacity of a system.

The electrode of a separation membrane can include a current collector, e.g., a metal, in electrical communication with the separation membrane 10. By way of example and without limitation, an electrode can include a material that is resistant to chemical attack such as platinum, silver, gold, iridium, osmium, palladium, rhodium, ruthenium, copper, stainless steel, glassy carbon, graphite, graphene, other transition metals, etc., as well as combinations of materials.

Optionally, an electrode can include a material that can catalyze formation of hydrogen ions at the separation membrane. For instance, a metal such as platinum can be utilized, as in the form of the metal hydride, that can function not only as a current collector but can also catalyze formation of hydrogen ions at the separation membrane. In another embodiment, an electrode can include a current collector and a catalyst as separate materials that can be provided as a composite in conjunction with a binder, as is known in the art.

In one particular embodiment, one or both of the electrodes can also function as another component of the separation membrane. For instance, in some embodiments, the separation membrane can include graphene as a hydrogen isotope selective layer that can also be utilized as an electrode or as a component of an electrode. For example, in an embodiment as illustrated at FIG. 2 (a), one or both of the outer hydrogen isotope selective layers 14 can include graphene and the graphene can be utilized as an electrode in application of a driving voltage across the separation membrane 10.

A sample provided to a feed chamber 2 can optionally be pre-processed prior to the isotope separation. For instance, a sample can be treated to remove water, solids, salts, etc. that could interfere with the separation process.

Through utilization of disclosed methods and systems, highly efficient hydrogen isotope separations can be carried out. For instance, non-aqueous separations can be carried out with a highly stable separation membrane, which can prove beneficial in a variety of applications.

The present disclosure may be better understood with reference to the Example, set forth below.

Example

Figure 4:
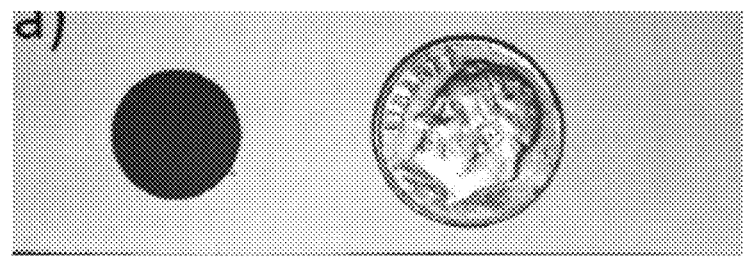
FIG. 4 illustrates one example of a separation membrane.

A solid state proton conductive ceramic of $BaCe_{0.7}Zr_{0.1}Y_{0.1}Yb_{0.1}O_{3-\delta}$ was synthesized and sintered. The sintered product is illustrated in FIG. 4. The dime is included in the illustration to provide a size context for the ceramic layer. A ceramic piece was coated with graphene to form a separation membrane. The graphene was synthesized via chemical vapor deposition on a catalyst metal. The graphene was transferred to the ceramic by a wet etch method with a polymer scaffold. In this method a polymer scaffold was spin coated onto the graphene-coated metal, and the underlying catalyst metal etched away before the graphene/polymer was placed on the ceramic, and finally the polymer was removed with solvent. Of course, the formation of the graphene-coated ceramic is not limited to this particular wet etch transfer method. Two-dimensional materials may also be transferred to the ceramic by polymer-free wet methods, dry transfers, roll-to-roll transfers, etc., as discussed in the literature (see, e.g., Y. Chen, X. L. Gong, and J. G. Gai, "Progress and Challenges in Transfer of Large-Area Graphene Films," Advanced science, vol. 3, no. 8, p. 1500343, 2016). The two-dimensional materials may also be synthesized directly onto the ceramic with methods such as chemical vapor deposition, reduction of graphene oxide, epitaxial synthesis, etc.

Following formation, the separation membrane was placed between two chambers in system as illustrated in FIG. 3. A protium/deuterium gas was fed to the feed chamber 2 and a separation protocol was carried out between 500° C. and 700° C.

Figure 5:
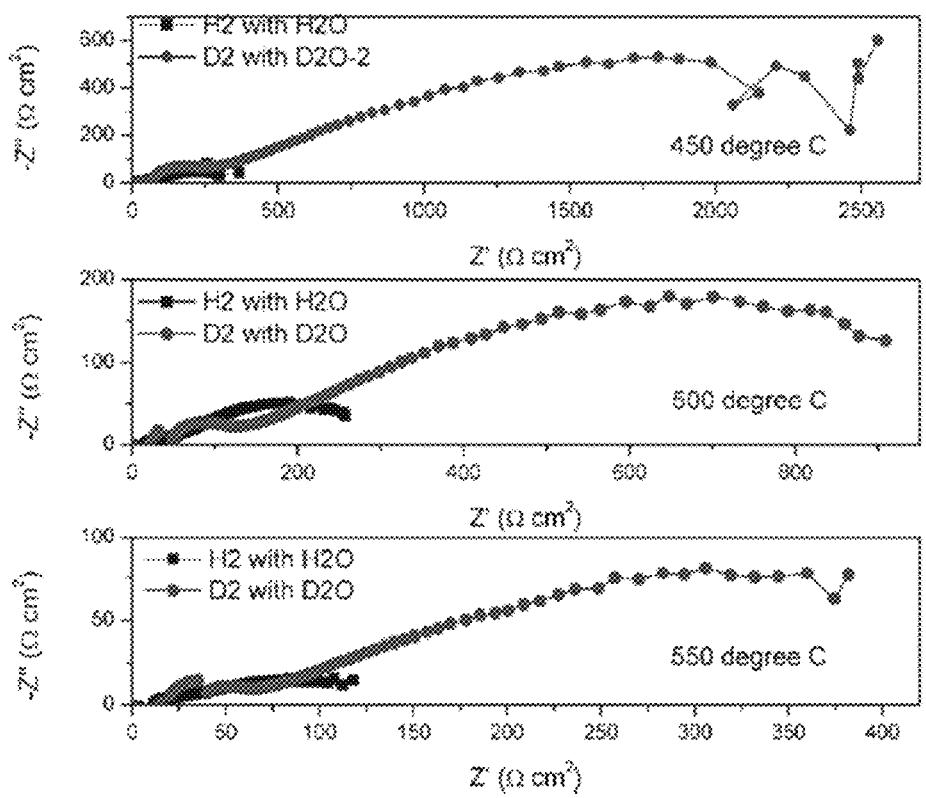
FIG. 5 presents raw data obtained and utilized to determine conductivities for protium and deuterium across a separation membrane and a bare hydrogen ion conductive layer at different temperatures.
Figure 6:
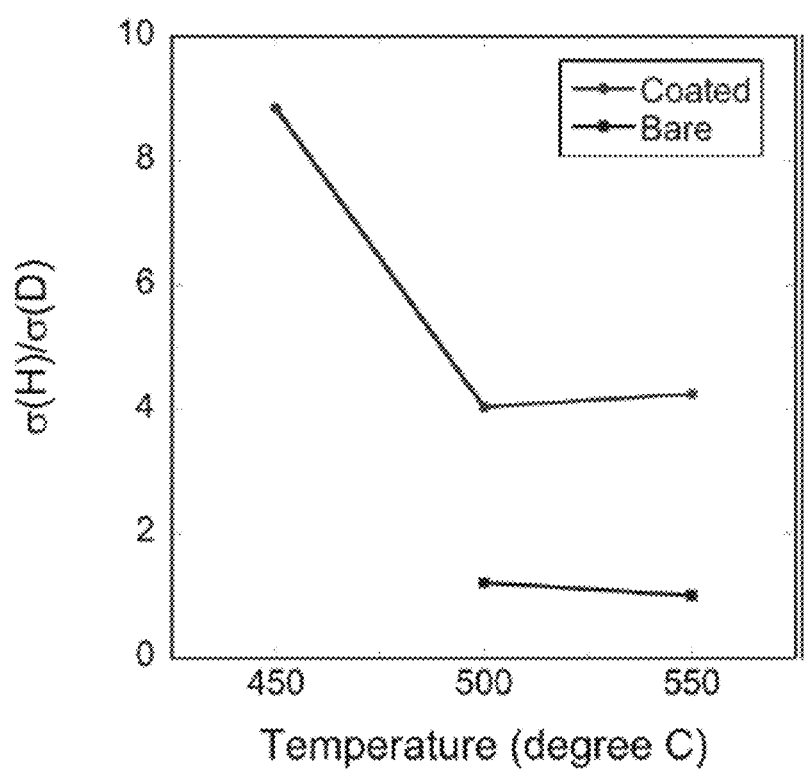
FIG. 6 compares the results of a separation protocol carried out with a bare hydrogen ion conductive layer and a separation membrane as described herein.

As comparison, a similar protocol was carried out with a bare ceramic layer that carried no graphene. The plots in FIG. 5 show the raw data used to calculate the conductivities for the two systems at different temperatures including 450° C. (top), 500° C. (middle) and 550° C. (bottom). In FIG. 6, the ratio of the conductivities of protium and deuterium across the bare ceramic layer and across a separation membrane is shown as described. As can be seen, the separation ratio for the bare membrane was about 1 with a maximum of 1.2 over the course of the protocol, demonstrating that the conductivity of the protons was similar to that of the deuterons. The sample coated with graphene exhibited a significantly higher proton conductivity as compared to deuteron conductivity.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for separating hydrogen isotopes from one another comprising:
    contacting a first side of a separation membrane with a sample, the sample comprising water in an amount of about 0.03 kg/m$^3$ or less, the sample including a first hydrogen isotope and a second hydrogen isotope, the separation membrane comprising a first layer and a second layer, the first layer comprising a crystalline material of from one to about 5 atomic or molecular layers and a metal selected from Groups 8 to 10 of the periodic table, wherein the metal reduces a thermal conduction barrier of the separation membrane, wherein the metal is present in a discontinuous fashion on a surface of the first layer, the second layer comprising a hydrogen ion conductive ceramic;
    heating the separation membrane to a separation temperature of about 200° C. or greater; and
    applying a voltage across the heated separation membrane from the first side of the separation membrane to the second side of the separation membrane, the voltage providing a driving force to selectively conduct the first hydrogen isotope across the separation membrane from the first side to the second side, thereby forming a product on the second side of the separation membrane that is enriched in the first hydrogen isotope, a remaining sample on the first side of the separation membrane being enriched in the second hydrogen isotope.

2. The method of claim 1, the sample further comprising a third hydrogen isotope, wherein the remaining sample on the first side of the separation membrane is enriched in the second hydrogen isotope and the third hydrogen isotope.

3. The method of claim 1, wherein the first hydrogen isotope comprises protium and the second hydrogen isotope comprises deuterium.

4. The method of claim 1, wherein the first hydrogen isotope comprises protium and the second hydrogen isotope comprises tritium.

5. The method of claim 1, wherein the voltage is about 20 Volts or less.

6. The method of claim 1, wherein the separation temperature is from about 200° C. to about 800° C.

7. The method of claim 1, further comprising contacting a first side of a second separation membrane with the product and applying a voltage across the second separation membrane.

8. The method of claim 7, further comprising repeating the process with one or more additional separation membranes.

9. The method of claim 1, the crystalline material comprising graphene, hexagonal boron nitride, or a transition metal chalcogenide.

10. The method of claim 1, the hydrogen ion conductive ceramic comprising a perovskite type ceramic.

11. The method of claim 1, wherein the sample comprises water in an amount of about 0.02 kg/m$^3$ or less.

12. The method of claim 1, wherein the sample is a dry sample.

13. The method of claim 1, wherein at least one layer of the crystalline material includes atoms in a hexagonal pattern.

14. The method of claim 10, wherein the perovskite type ceramic comprises $BaZrO_3$, $BaCeO_3$, $SrCeO_3$, $CaZrO_3$, $SrZRO_3$, or $BaCe_{0.7}Zr_{0.1}Y_{0.1}Yb_{0.1}O_{3-\delta}$.

15. The method of claim 3, wherein the method separates the protium from the deuterium with a single step separation factor of about 3.3 or greater.

16. The method of claim 4, wherein the method separates the protium form the tritium with a single step separation factor of from about 10 to about 30.

17. The method of claim 1, wherein the voltage is about 5 Volts or less.

18. The method of claim 1, the crystalline material comprising graphene, wherein the graphene further functions as an electrode in application of the voltage across the heated separation membrane.

* * * * *